US009905830B2

(12) United States Patent
Kim et al.

(10) Patent No.: US 9,905,830 B2
(45) Date of Patent: Feb. 27, 2018

(54) RECHARGEABLE BATTERY MODULE (71) Applicant: Samsung SDI Co., Ltd., Yongin-si, Gyeonggi-do (KR)

(72) Inventors: Young-Deok Kim, Yongin-si (KR); Ji-Soon Lim, Yongin-si (KR); Shi-Dong Park, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 15/336,312

(22) Filed: Oct. 27, 2016

(65) Prior Publication Data
US 2017/0125770 A1 May 4, 2017

(30) Foreign Application Priority Data

Nov. 4, 2015 (KR) .................. 10-2015-0154635

(51) Int. Cl.
*H01M 2/20* (2006.01)
*H01M 10/04* (2006.01)
(Continued)

(52) U.S. Cl.
CPC ......... *H01M 2/204* (2013.01); *H01M 2/1022* (2013.01); *H01M 2/1077* (2013.01); *H01M 2/206* (2013.01); *H01M 2/305* (2013.01); *H01M 10/04* (2013.01); *H01M 2220/20* (2013.01); *H01M 2220/30* (2013.01)

(58) Field of Classification Search
CPC .... H01M 2/204; H01M 10/04; H01M 2/1077; H01M 2/1022; H01M 2/305; H01M 2220/20; H01M 2220/30; H01M 2/206
See application file for complete search history.

(56) References Cited

U.S. PATENT DOCUMENTS

2004/0018417 A1* 1/2004 Stack .................. H01H 85/044
429/61
2011/0081568 A1 4/2011 Kim et al.
(Continued)

FOREIGN PATENT DOCUMENTS

DE 10-2012-102270 A1 9/2012
KR 10-2011-0037844 A 4/2011
(Continued)

OTHER PUBLICATIONS

EPO Extended Search Report dated Jan. 24, 2017, for corresponding European Patent Application No. 16197415.9 (7 pages).

*Primary Examiner* — Stewart A Fraser
*Assistant Examiner* — Monique M Wills
(74) *Attorney, Agent, or Firm* — Lewis Roca Rothgerber Christie LLP (57) ABSTRACT A rechargeable battery module includes: a plurality of unit cells arranged along a first direction; a bus bar holder on the unit cells; a bus bar in the bus bar holder electrically connecting the unit cells; first and second end plates on opposite ends of the unit cells in the first direction; and a side plate on opposite ends of the unit cells in a second direction intersecting the first direction and connected to the end plates, wherein the bus bar comprises a first member extending in the first direction and connected to electrode terminals of the unit cells, and a second member connected to the first member.

11 Claims, 9 Drawing Sheets (51) Int. Cl.
*H01M 2/10* (2006.01)
*H01M 2/30* (2006.01)

(56) References Cited

U.S. PATENT DOCUMENTS

| | | |
|---|---|---|
| 2015/0079453 A1 | 3/2015 | Choi et al. |
| 2015/0171405 A1* | 6/2015 | Lee .................. H01M 2/24 |
| | | 429/89 |
| 2015/0207127 A1 | 7/2015 | Davis et al. |
| 2015/0243957 A1 | 8/2015 | Han et al. |
| 2015/0372265 A1* | 12/2015 | Morisaku .............. H01M 2/204 |
| | | 429/90 |
| 2016/0093851 A1* | 3/2016 | Lobert ................ H01M 2/1077 |
| | | 429/94 |

FOREIGN PATENT DOCUMENTS

| | | |
|---|---|---|
| KR | 10-2015-0031093 A | 3/2015 |
| WO | WO 2013/051012 A2 | 4/2013 |

* cited by examiner

RECHARGEABLE BATTERY MODULE

CROSS-REFERENCE TO RELATED APPLICATION

This application claims priority to and the benefit of Korean Patent Application No. 10-2015-0154635, filed on Nov. 4, 2015, in the Korean Intellectual Property Office, the entire content of which is incorporated herein by reference.

BACKGROUND OF THE INVENTION (a) Field

One or more aspects of example embodiments of the present invention relate to a rechargeable battery module.

(b) Description of the Related Art

A rechargeable battery may be repeatedly charged and discharged, unlike a primary battery that is typically not recharged. Rechargeable batteries having a small capacity may be utilized for portable small electronic devices such as mobile phones, laptop computers, camcorders, etc., and rechargeable batteries having a large capacity may be utilized, for example, for a motor driving power source of hybrid vehicles or electric vehicles.

Rechargeable batteries may utilize a single cell such as for small electronic device applications. Additionally, some rechargeable batteries may utilize a module in which a plurality of cells are electrically connected to each other. Some rechargeable batteries may utilize a pack of battery modules, in which a plurality of modules are electrically connected such as that for driving a motor.

For example, a rechargeable battery module may be formed by arranging a plurality of unit cells in one direction (an x-axis direction), arranging end plates at opposite ends in an arrangement direction of the unit cells, arranging side plates at opposite lateral sides in the arrangement direction of the unit cells, welding (or connecting) the side plates to the end plates, and connecting the unit cells using a bus bar.

The bus bar may be connected to electrode terminals of the unit cells and to a power cable. Accordingly, a current of the unit cells may be discharged through the bus bar to the power cable or charged through the bus bar connected to an external power source by the power cable.

A connection of the bus bar connected to the power cable may be melted by high heat generated by a current concentration phenomenon that may occur in the connection. Therefore, the rechargeable battery module may be unstable in a high-capacity electric vehicle.

Further, in instances in which the rechargeable battery module is mounted in the electric vehicle, the unit cells may experience vibration in an x-axis arrangement direction and a z-axis height direction. Accordingly, the bus bar may experience the vibration of each unit cell in each x-axis direction and in each z-axis direction. As a result, the bus bar may have a weakness in a connecting structure of the unit cells.

The above information disclosed in this Background section is only for enhancement of understanding of the background of the invention and therefore it may contain information that does constitute prior art.

SUMMARY OF THE INVENTION

One or more aspects of example embodiments of the present invention relate to a rechargeable battery module including a plurality of unit cells in a space defined by a side plate and an end plate, and electrically connecting the unit cells using a bus bar.

According to some example embodiments of the present invention, electrical and mechanical connections of unit cells and a bus bar of a rechargeable battery module may be relatively stable. Additionally, according to some example embodiments of the present invention, the connection structure of a bus bar and a power cable of a rechargeable battery module may be relatively stable.

According to some example embodiments of the present invention, a rechargeable battery module includes: a plurality of unit cells arranged along a first direction; a bus bar holder on the unit cells; a bus bar in the bus bar holder electrically connecting the unit cells; first and second end plates on opposite ends of the unit cells in the first direction; and a side plate on opposite ends of the unit cells in a second direction intersecting the first direction and connected to the end plates, wherein the bus bar includes a first member extending in the first direction and connected to electrode terminals of the unit cells, and a second member connected to the first member.

According to some example embodiments, the first member has a first thickness and is connected to the electrode terminal through a bus bar hole of the bus bar holder.

According to some example embodiments, the second member has a second thickness thicker than the first thickness and is in the bus bar holder and connected to a surface of the first member.

According to some example embodiments, the first member is connected to the electrode terminal, and bends to extend in a third direction intersecting the second direction and is connected to an upper surface of the second member.

According to some example embodiments, the first member includes a cutout between the electrode terminals neighboring in the first direction, and extends in the second direction to a position beyond the electrode terminal.

According to some example embodiments, the first member includes an expansion at an internal end of the cutout having a generally circular arc shape with a diameter wider than a gap of the cutout.

According to some example embodiments, the bus bar holder further includes a protrusion extending further than the first member in the third direction between the bus bar holes neighboring in the first direction to be joined to the cutout.

According to some example embodiments, the first member includes aluminum, and the second member includes copper.

According to some example embodiments, the bus bar includes a connection connected to a cable terminal of a power cable, and has a maximum width in the second direction at the connection.

According to some example embodiments, a portion of the first member is removed to expose a surface of the second member to form the connection.

According to some example embodiments, the cable terminal and the connection are connected by an ultrasonic welding.

According to some example embodiments, the bus bar holder and the bus bar are joined to each other to form a sub assembly.

According to some example embodiments of the present invention, a rechargeable battery module includes a bus bar including a first member and a second member connected to each other, while the first member connects electrode terminals of unit cells and the second member increases the conducting area, thereby maintaining a relatively stable electrical and mechanical connection structure of the unit cells and the bus bar.

DETAILED DESCRIPTION OF THE EMBODIMENTS

Aspects of some example embodiments of the present invention will be described more fully hereinafter with reference to the accompanying drawings, in which example embodiments of the invention are shown. As those skilled in the art would realize, the described embodiments may be modified in various different ways, all without departing from the spirit or scope of the present invention. The drawings and descriptions are to be regarded as illustrative in nature and not restrictive. Like reference numerals designate like elements throughout the specification.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
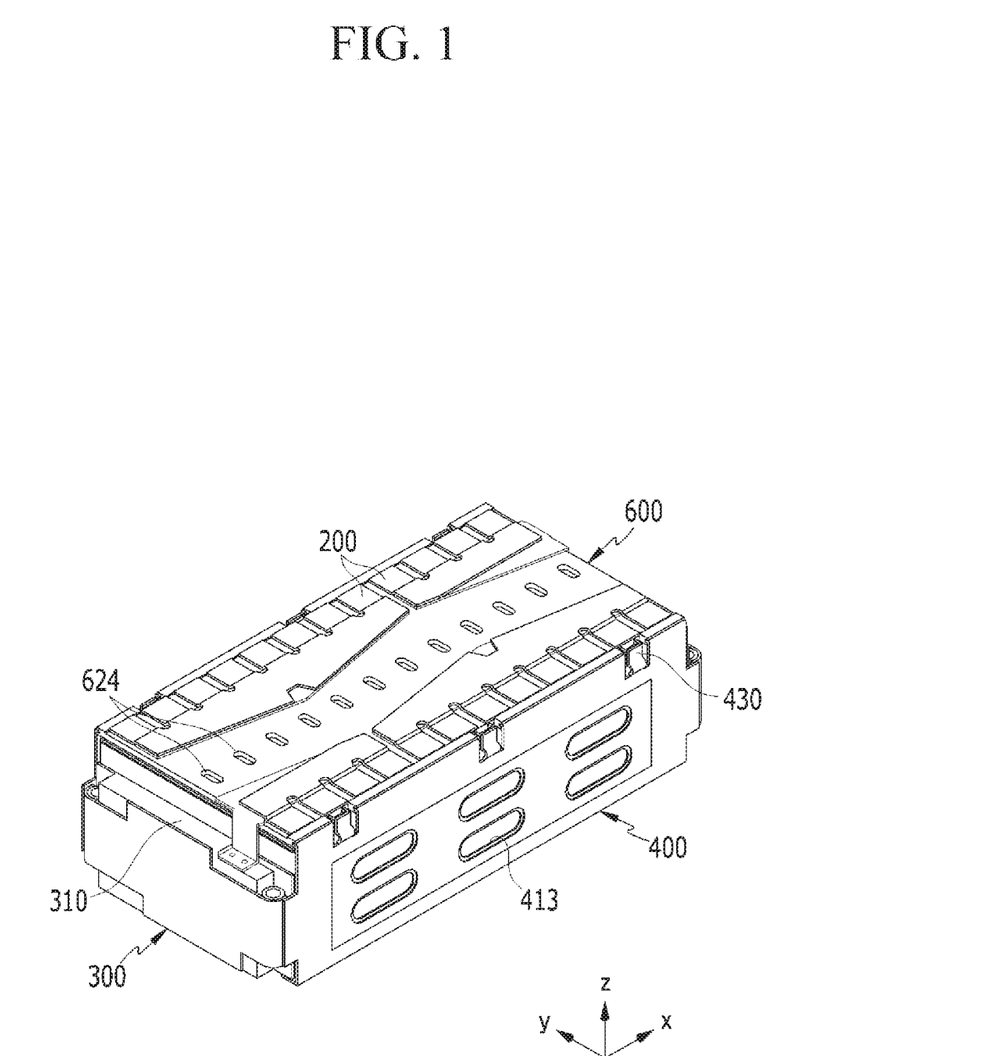
FIG. 1 is a perspective view illustrating a rechargeable battery module according to some example embodiments of the present invention.
Figure 2:
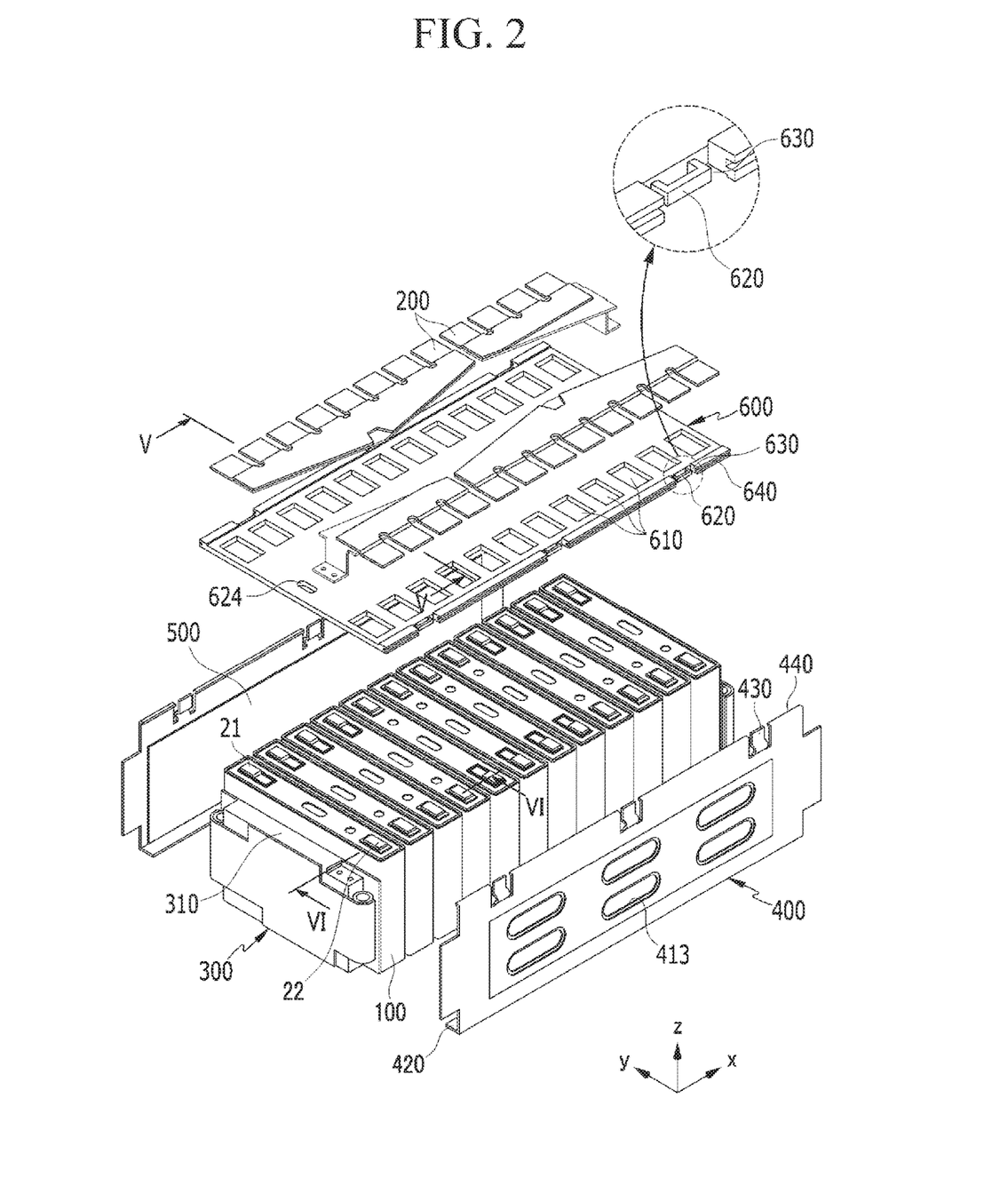
FIG. 2 is an exploded perspective view illustrating further details of the rechargeable battery module shown in FIG. 1.

FIG. 1 is a perspective view illustrating a rechargeable battery module according to some example embodiments of the present invention and FIG. 2 is an exploded perspective view illustrating further details of the rechargeable battery module shown in FIG. 1. Referring to FIG. 1 and FIG. 2, the rechargeable battery module according to some example embodiments of the present invention includes a plurality of unit cells 100 as part of a rechargeable battery, a bus bar holder 600 for covering the unit cells 100, bus bars 200 arranged in the bus bar holder 600 to electrically connect the unit cells 100, and an end plate 300 and a side plate 400 for accommodating and supporting the unit cells 100.

The unit cells 100 are adjacently arranged in a first direction (e.g., an x-axis direction) and are electrically and mechanically connected to each other by the bus bars 200 to form the rechargeable battery module. The bus bar holder 600 is arranged at an upper portion of the unit cells 100 to cover or overlap the unit cells 100.

The bus bars 200 are arranged on an exterior of the bus bar holder 600 to connect the unit cells 100. For example, the bus bars 200 may operate to couple four unit cells 100 adjacently arranged in the rechargeable battery module in parallel, and to couple a first group of four unit cells 100 adjacently arranged in parallel with a second group of four unit cells 100 adjacently arranged in parallel.

The end plate 300 may include a pair of end plates (e.g., first and second end plates) 300, which are respectively arranged at opposite ends of the unit cells 100 along the first direction (e.g., in the x-axis direction) to support outermost unit cells 100. For example, the end plates 300 may support the unit cells 100 by interposing end supports 310 on inner sides of the opposite ends in a length direction (e.g., the first direction or the x-axis direction) of the rechargeable battery module.

Each of the end plates 300 may be formed of a metal or metallic material (e.g., stainless steel) to provide mechanical strength to support the rechargeable battery module at an outermost end thereof (e.g., in the first direction or the x-axis direction). Each of the end supports 310 may be formed of an electrical insulator material and may operate to electrically insulate the end plates 300 from the unit cells 100, while supporting the unit cells 100.

The side plate 400 may include a pair (or plurality) of the side plates 400, which are respectively arranged at opposite ends in a second direction (e.g., a y-axis direction) intersecting (e.g., perpendicular with respect to) the first direction (e.g., the x-axis direction) and are mechanically connected to the end plates 300. That is, the side plates 400 may operate to accommodate and support the unit cells 100 on opposite sides in a width direction (e.g., the second direction or the y-axis direction) of the rechargeable battery module.

The end plates 300 and the side plates 400 are combined with or mechanically attached or secured to each other by welding or any other suitable attachment technique. The side plates 400 may be combined with or mechanically attached or secured to the bus bar holder 600 by welding or any other suitable attachment technique. The end plates 300, the side plates 400, and the bus bar holder 600 are configured to form a space therein for accommodating (e.g., receiving) and supporting the unit cells 100.

Each of the side plates 400 may include one or more through holes 413 adjacent to the unit cells 100 to decrease weight of the side plates 400. The through hole(s) 413 may include a plurality of through holes formed along the first direction (e.g., the x-axis direction) and a third direction perpendicular to the first and second directions (e.g., a z-axis direction). The through holes 413 may further operate to decrease weight of the side plates 400, while maintaining the strength of the side plates 400.

The bus bar holder 600 includes the bus bars 200 and bus bar holes 610 for connecting the unit cells 100. Accordingly, the bus bars 200 arranged on the exterior of the bus bar holder 600 may be electrically connected to the unit cells 100 through the bus bar holes 610.

Herein, the bus bar holder 600 and the side plates 400 are configured to have a clamping force in the second direction (e.g., the y-axis direction) and the third direction (e.g., the z-axis direction), and are joined to or mechanically attached to each other. Accordingly, the rechargeable battery module may be protected effectively from vibration generated in the y-axis and z-axis directions.

For example, the bus bar holder 600 may be formed of a synthetic resin, and may include a bracket 620 protruding or extending toward the opposite ends in the second direction (e.g., the y-axis direction). As an example, the bracket 620 may be formed in the bus bar holder 600 by insert injection molding. The bracket 620 may be formed of stainless steel that is identical (or similar) to a material of the side plate 400, and may be welded (or connected or mechanically attached) to the side plate 400.

For example, the bracket 620 may include a plurality of brackets 620, and may be arranged along the first direction (e.g., the x-axis direction) at an interval (e.g., a predetermined interval) in the bus bar holder 600. Further, the side plate 400 may include connectors 430 arranged in the first direction (e.g., the x-axis direction) at the interval (e.g., the predetermined interval) to correspond to the brackets 620 of the bus bar holder 600.

For example, the brackets 620 of the bus bar holder 600 may be connected to the connectors 430 of the side plate 400 by welding. Herein, the bus bar holder 600 may include installation grooves 630 around the brackets 620 to provide a space through which a welding heat is dissipated.

Because the bus bar holder 600 including the brackets 620 and the side plate 400 including the connectors 430 have a relatively strong clamping force in the second direction (e.g., the y-axis direction) and the third direction (e.g., the z-axis direction) for welding (or connecting) the brackets 620 and the connectors 430, it may be possible to effectively manage the vibration generated in the second direction (e.g., the y-axis direction) and the third direction (e.g., the z-axis direction).

Meanwhile, the side plate 400 may further include a flange 420 bent toward the second direction (e.g., the y-axis direction) at a lower end portion thereof in the third direction (e.g., the z-axis direction) intersecting the first and second directions (e.g., the x- and y-axis directions) for supporting the unit cells 100.

The flange 420 may contribute to weight reduction by enabling a lower plate for supporting lower ends of the unit cells 100 in the rechargeable battery module to be omitted. According to some embodiments of the present invention, however, the rechargeable battery module may include a lower plate for supporting lower ends of the unit cells 100 in the rechargeable battery module. Further, the flange 420 may facilitate cooling by adhering the unit cells 100 to a cooling means (not shown) directly, when the rechargeable battery module is incorporated into another device (e.g., an electric vehicle).

Accordingly, the side plate 400 may support the lower ends of the unit cells 100 by the flange 420 at the lower end thereof and may be joined to the bus bar holder 600 covering the unit cells 100 by the connectors 430 arranged at an upper end thereof.

That is, the flange 420 and the connectors 430 of the side plate 400 generate the clamping force in the third direction (e.g., the z-axis direction) with respect to the unit cells 100 and the bus bar holder 600. Accordingly, the clamping force generated in the third direction (e.g., the z-axis direction) may protect the rechargeable battery module effectively from the vibration generated in the third direction (e.g., the z-axis direction).

The side plate 400 may be formed of a thin-plate sheet metal having a thickness (e.g., a predetermined thickness). For example, the side plate 400 may be formed of thin-plate stainless steel. Further, an insulating sheet 500 may be further arranged between the side plate 400 and the unit cells 100. The insulating sheet 500 may operate to electrically insulate the side plate 400 from the unit cells 100.

Further, the bus bar holder 600 may further include a joining groove 640 that is formed along the first direction (e.g., the x-axis direction) to be separated in the third direction (e.g., the z-axis direction) from the opposite ends in the second direction (e.g., the y-axis direction). The side plate 400 includes a joining portion 440 joined to the joining groove 640.

The joining portion 440 of the side plate 400 is joined to the joining groove 640 of the bus bar holder 600. Accordingly, the side plate 400 and the bus bar holder 600 generate the clamping force in the third direction (e.g., z-axis direction) with respect to the unit cells 100 and the bus bar holder 600. The clamping force generated in the third direction (e.g., the z-axis direction) may protect the rechargeable battery module further effectively from the vibration generated in the third direction (e.g., the z-axis direction).

Figure 3:
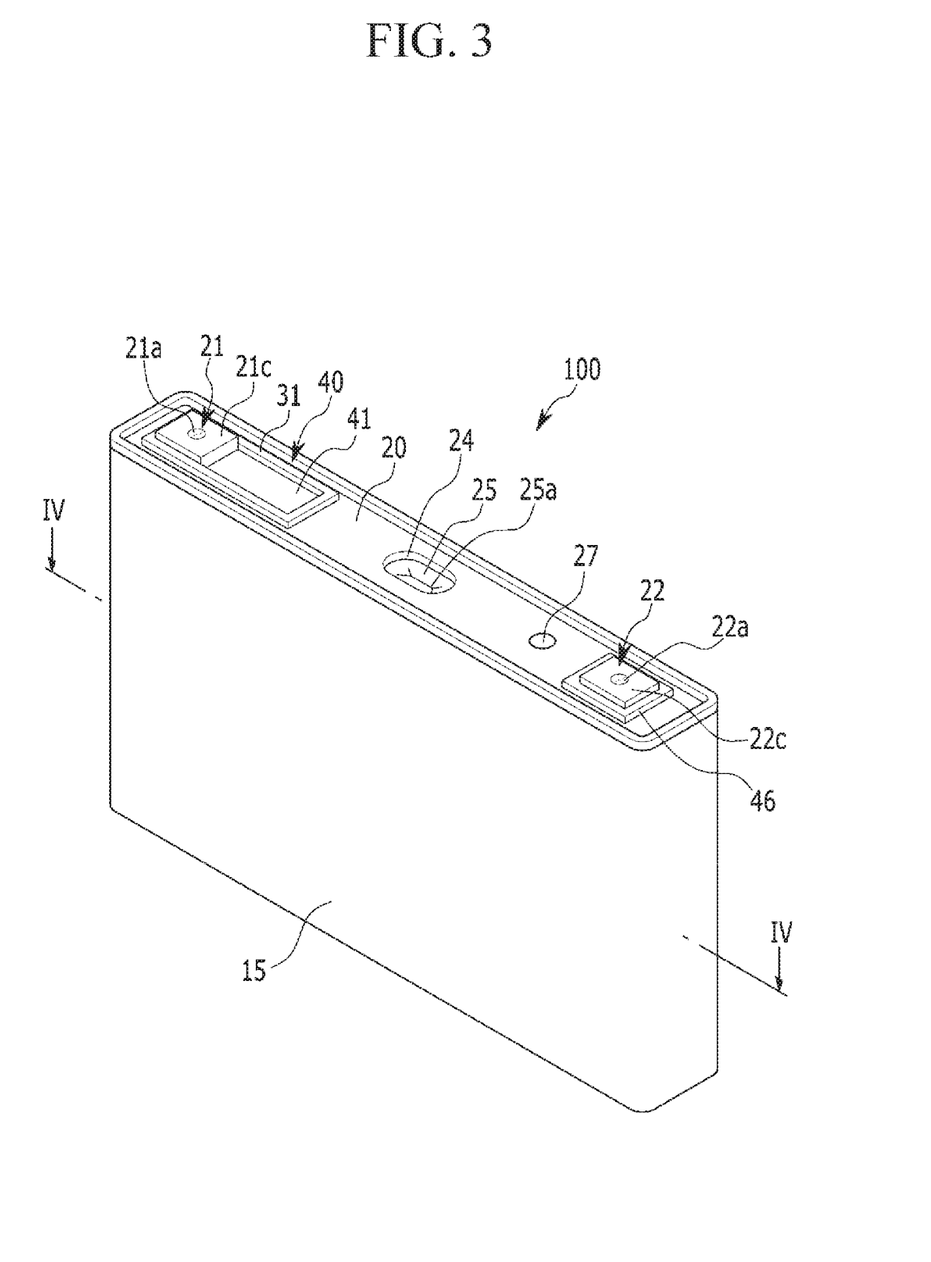
FIG. 3 is a perspective view illustrating further details of the rechargeable battery shown in FIG. 2.
Figure 4:
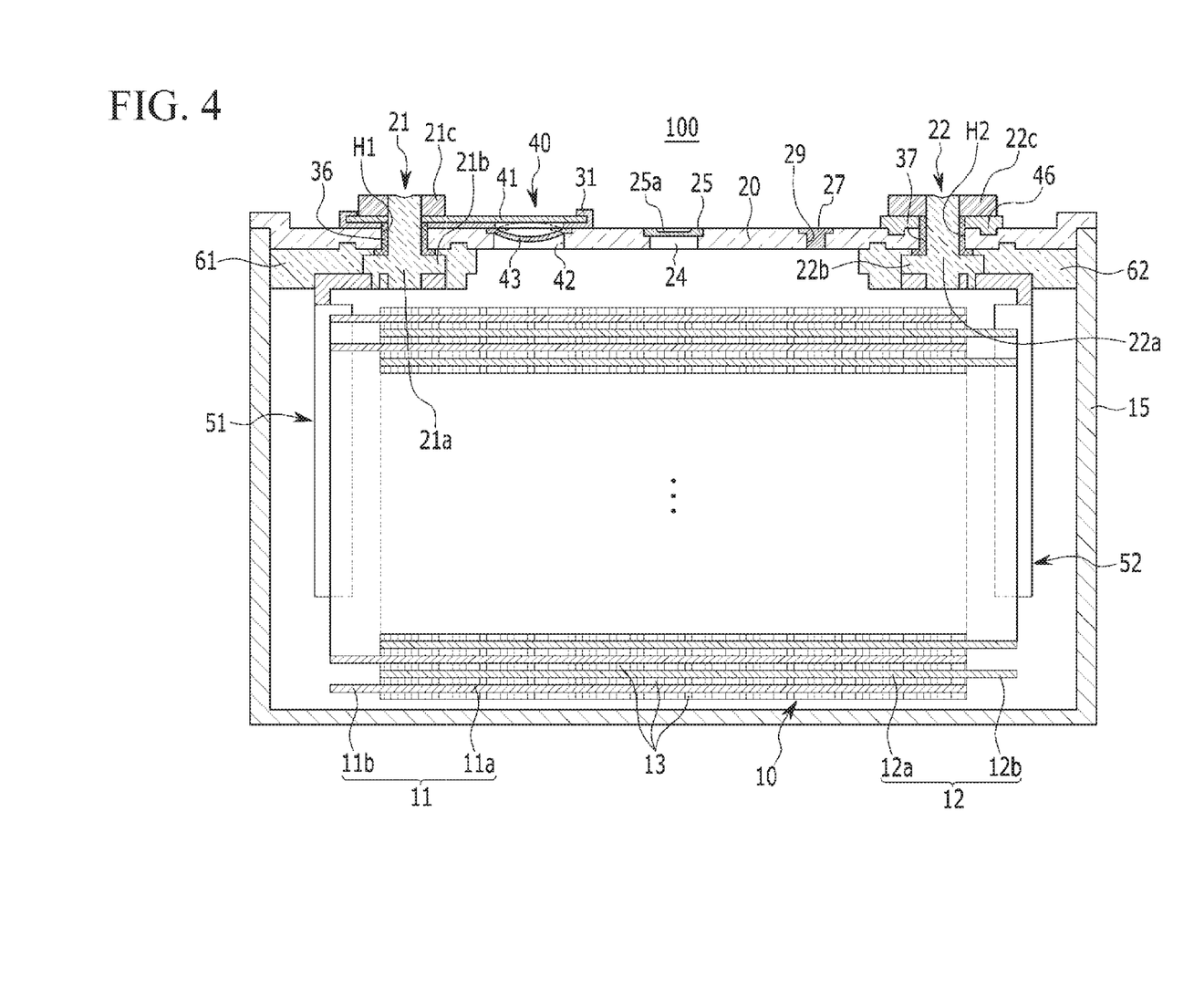
FIG. 4 is a cross-sectional view taken along the line IV-IV of FIG. 3.

FIG. 3 is a perspective view illustrating further details of the rechargeable battery shown in FIG. 2 and FIG. 4 is a cross-sectional view taken along the line IV-IV of FIG. 3. Referring to FIG. 3 and FIG. 4, one unit cell 100 includes a rechargeable battery which charges and discharges.

The unit cell 100 includes an electrode assembly 10, a case 15 for accommodating the electrode assembly 10, a cap plate 20 joined to an opening of the case 15, a first electrode terminal 21 (hereinafter, referred as a negative terminal) and a second electrode terminal 22 (hereinafter, referred as a positive terminal), and an external short-circuiter 40 arranged on a side of the negative terminal 21.

For example, the electrode assembly 10 may be formed in a jelly roll configuration by spirally winding a first electrode 11 (hereinafter, referred as a negative electrode), a separator 13 that is an insulator, and a second electrode 12 (hereinafter, referred as a positive electrode), while arranging the negative electrode 11 and the positive electrode 12 on the opposite sides of the separator 13.

The negative electrode 11 and the positive electrode 12 include respectively coating regions 11a and 12a formed of a current collector of a metal plate coated with an active material, and uncoated regions 11b and 12b formed of the current collector exposed due to an absence of coating with the active material.

The uncoated region 11b of the negative electrode 11 is formed at one end portion of the negative electrode 11 in a direction along the negative electrode 11 that is spirally wound. The uncoated region 12b of the positive electrode 12 is formed at one end portion of the positive electrode 12 in the direction along the positive electrode 12 that is spirally wound. The uncoated regions 11b and 12b are respectively arranged at the opposite ends of the electrode assembly 10.

For example, the case 15 may be configured to have a generally (e.g., substantially) cuboidal shape to form a space for accommodating the electrode assembly 10 and an electrolyte solution, and may form an opening connecting an interior and an exterior on one surface thereof. The opening enables the electrode assembly 10 to be inserted into the interior of the case 15.

The cap plate 20 is mounted to the opening of the case 15 to close and seal of the opening of the case 15. For example, the case 15 and the cap plate 20 may be made of aluminum to be welded (or mechanically attached or connected) together.

Further, the cap plate 20 includes an electrolyte injection opening 29, a vent hole 24, and terminal holes H1 and H2. The electrolyte injection opening 29 enables an electrolyte solution to be injected into the interior of the case 15 after the cap plate 20 is joined to the case 15. After the electrolyte solution is injected thereinto, the electrolyte injection opening 29 is sealed by a sealing cap 27.

The vent hole 24 is closed and sealed by a vent plate 25 to discharge an internal pressure of the unit cell 100. If the internal pressure of the unit cell 100 reaches a level (e.g., a predetermined level), vent plate 25 is ruptured to open the vent hole 24. The vent plate 25 includes a notch 25a for inducing the rupture.

Meanwhile, referring to FIG. 1 and FIG. 2, the bus bar holder 600 further includes a holder vent hole 624 corresponding to the vent hole 24. Accordingly, the internal pressure discharged through the vent hole 24 may be discharged through the holder vent hole 624 to the exterior of the rechargeable battery module. In other words, the internal pressure discharged through the vent hole 24 is not interrupted by the bus bar holder 600.

Referring to FIG. 3 and FIG. 4 again, the negative terminal 21 and the positive terminal 22 are mounted in the terminal holes H1 and H2 of the cap plate 20 and are electrically connected to the electrode assembly 10. That is, the negative terminal 21 is electrically connected to the negative electrode 11 of the electrode assembly 10, and the positive terminal 22 is electrically connected to the positive electrode 12 of the electrode assembly 10. Accordingly, the electrode assembly 10 is drawn outside the case 15 through the negative terminal 21 and the positive terminal 22.

Because the negative terminal 21 and the positive terminal 22 form an identical structure to each other in an internal side of the cap plate 20, the identical structure will be described jointly, and because the negative terminal 21 and the positive terminal 22 form different structures from each other in an external side of the cap plate 20, the different structures will be described individually.

The negative and positive terminals 21 and 22 respectively include rivet terminals 21a and 22a mounted in the terminal holes H1 and H2 of the cap plate 20, flanges 21b and 22b formed widely and integrally with the terminals 21a and 22a at the internal side of the cap plate 20, and plate terminals 21c and 22c arranged at the external side of the cap plate 20 and connected to the rivet terminals 21a and 22a by riveting or welding, or any other suitable connection method.

Negative and positive gaskets 36 and 37 are respectively mounted between the rivet terminals 21a and 22a of the negative and positive terminals 21 and 22 and internal surfaces of the terminal holes H1 and H2, to seal and electrically insulate the rivet terminals 21a and 22a of the positive and negative terminals 21 and 22 and the cap plate 20.

The negative and positive gaskets 36 and 37 further seal and electrically insulate the flanges 21b and 22b and the cap plate 20 by extending between the flanges 21b and 22b and the internal surface of the cap plate 20. That is, the negative and positive gaskets 36 and 37 prevent (or reduce instances of) the electrolyte solution from leaking through the terminal holes H1 and H2 by mounting the positive and negative terminals 21 and 22 in the cap plate 20.

Negative and positive lead tabs 51 and 52 respectively electrically connect the negative and positive terminals 21 and 22 to the positive and negative electrodes 11 and 12 of the electrode assembly 10. For example, the negative and positive lead tabs 51 and 52 are joined to the lower ends of the rivet terminals 21a and 22a while being supported by the flanges 21b and 22b by joining the negative and positive lead tabs 51 and 52 to the lower ends of the rivet terminals 21a and 22a to caulk (or seal) the lower ends thereof.

Negative and positive insulating members 61 and 62 are mounted between the negative and positive lead tabs 51 and 52 and the cap plate 20, to electrically insulate the negative and positive lead tabs 51 and 52 and the cap plate 20. Further, the negative and positive insulating members 61 and 62 are joined to the cap plate 20 at one side thereof and cover the negative and positive lead tabs 51 and 52, the rivet terminals 21a and 22a, and the flanges 21b and 22b at the other side thereof, thereby stabilizing a connection structure thereof.

Meanwhile, the external short-circuiter 40 and a top plate 46 will be described in association with a plate terminal 21c of the negative terminal 21 and a plate terminal 22c of the positive terminal 22, respectively.

The external short-circuiter 40 arranged at the side of the negative terminal 21 includes a short-circuit tab 41 spaced apart or short-circuited depending on the internal pressure and a short-circuit member 43. The short-circuit tab 41 is electrically connected to the rivet terminal 21a of the negative terminal 21, and is arranged on the external side of the cap plate 20 with an insulating member 31 therebetween.

The insulating member 31 is mounted between the short-circuit tab 41 and the cap plate 20 to electrically insulate the short-circuit tab 41 and the cap plate 20. That is, the cap plate 20 serves to maintain an electrically insulated state with respect to the negative terminal 21.

The short-circuit tab 41 and the plate terminal 21c are joined to the upper end of the rivet terminal 21a by joining the short-circuit tab 41 and the plate terminal 21c to the upper end of the rivet terminal 21a to caulk (or seal) the upper end thereof. Accordingly, the short-circuit tab 41 and the plate terminal 21c are fixed to the cap plate 200 with the insulating member 31 therebetween.

The short-circuit member 43 is mounted in a short-circuit hole 42 formed on the cap plate 20. The short-circuit tab 41 is connected to the negative terminal 21 to extend along the external side of the short-circuit member 43. Accordingly, the short-circuit tab 41 and the short-circuit member 43 may maintain a separated state (represented by a solid line by being arranged to correspond to the short-circuit hole 42 and to face each other, and may be changed to a short-circuit state (represented by an imaginary line) by reversal of the short-circuit member 43 when the internal pressure of the unit cell 100 increases.

The top plate 46 at the side of the positive terminal 22 electrically and directly connects the plate terminal 22c of the positive terminal 22 and the cap plate 20. For example, the top plate 46 may be interposed between the plate terminal 22c and the cap plate 20, and the rivet terminal 22a extends through the top plate 46.

Accordingly, the top plate 46 and the plate terminal 22c are joined to the upper portion of the rivet terminal 22a by joining the top plate 46 and the plate terminal 22c to the upper portion of the rivet terminal 22a to caulk (or seal) the upper end portion thereof. The plate terminal 22c is mounted on the external side of the cap plate 20, with the top plate 46 therebetween.

Meanwhile, the positive gasket 37 is further extended between the rivet terminal 22a and the top plate 46. Accordingly, the positive gasket 37 prevents the rivet terminal 22a and the top plate 46 from electrically and directly being connected to each other. That is, the rivet terminal 22a is electrically connected to the top plate 46 through the plate terminal 22c.

Figure 5:
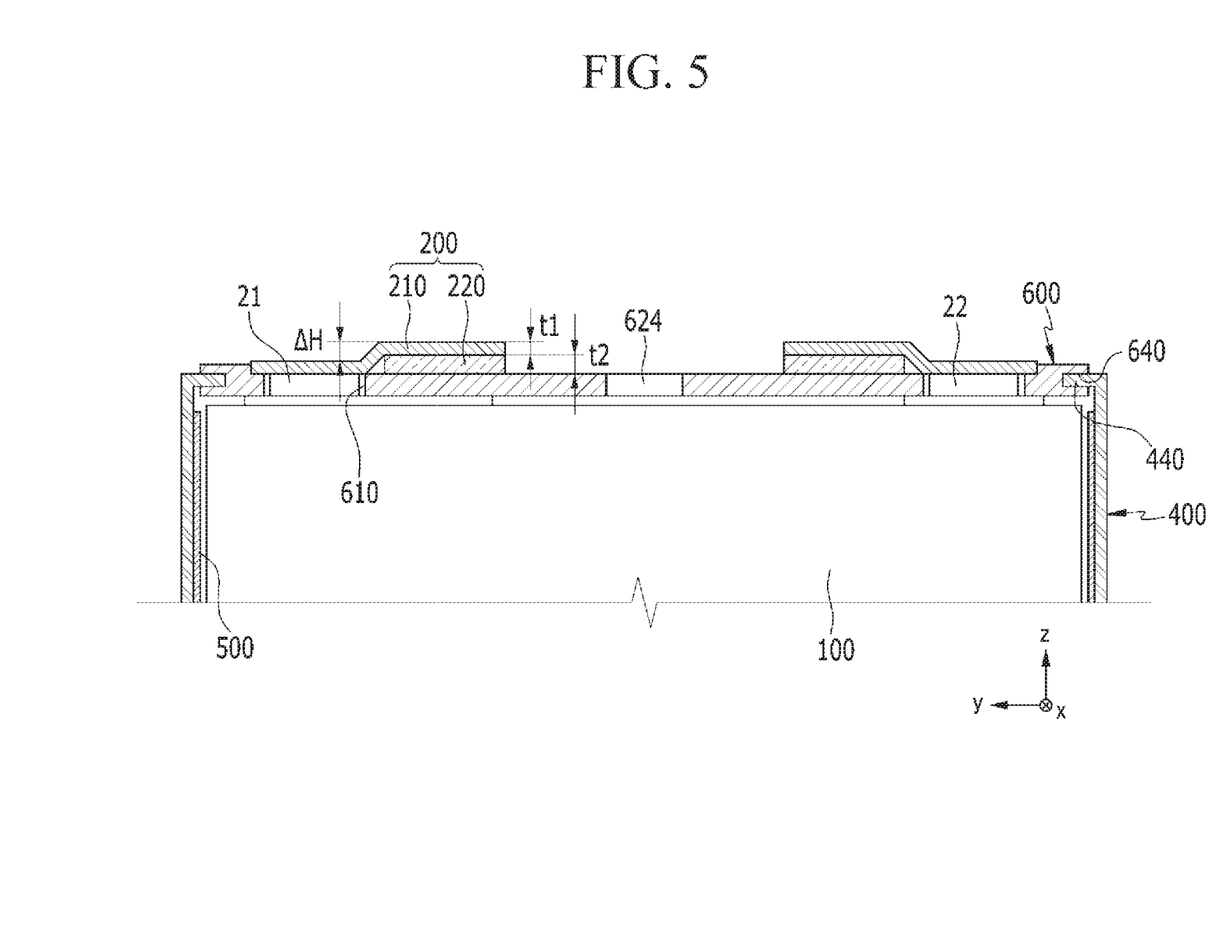
FIG. 5 is a cross-sectional view taken along the line V-V of FIG. 2.

FIG. 5 is a cross-sectional view taken along the line V-V of FIG. 2. Referring to FIG. 1, FIG. 2, and FIG. 5, each of the bus bars 200 includes a first member 210 extending in the x-axis direction and connected to the negative and positive terminals 21 and 22 of the unit cells 100 at a first side thereof, and a second member 220 attached on a second side of the first member 210 to increase a conducting area of the bus bar 200, in the rechargeable battery module according to the example embodiment of the present invention.

For example, the first member 210 may be formed of aluminum, and the second member 220 may be formed of copper that has excellent conductivity. In this case, the plate terminals 21c and 22c of the negative and positive terminals 21 and 22 may be formed of aluminum to increase weldability with the first member 210.

The first member 210 is configured to have a first thickness t1 and welded (or connected) to the negative and positive terminals 21 and 22 through the bus bar hole 610 of the bus bar holder 600. The second member 220 is arranged on the bus bar holder 600 to have a second thickness t2 thicker than the first thickness t1, and is connected to a facing surface of the first member 210.

The first member 210 is welded (or connected) to the negative and positive terminals 21 and 22 and bended to protrude in the third direction (e.g., the z-axis direction) intersecting the second direction (e.g., the y-axis direction) to be connected to an upper surface of the second member 220. That is, the second member 220 is arranged on the bus bar holder 600, and a bended portion of the first member 210 is in surface contact with the upper surface of the second member 220.

The first member 210 operates to connect the bus bar 200 to the negative and positive terminals 21 and 22, and the second member 220 mainly serves to conduct the current flowing through the first member 210. Therefore, the bus bar 200 may be effectively applied to the unit cells 100 having high-capacity by adjusting the second thickness t2 of the second member 220.

A height ΔH of the bus bar 200 may be partially lowered than a summation height of the first thickness t1 and the second thickness t2 since the first member 210 having the first thickness t1 is connected to the negative and positive terminals 21 and 22. Further, the second member 220 having the second thickness t2 may secure a large conducting area in which the current flows from a whole of the bus bar 200 even though the first member 210 has the first thickness t1, which is thin.

Figure 6:
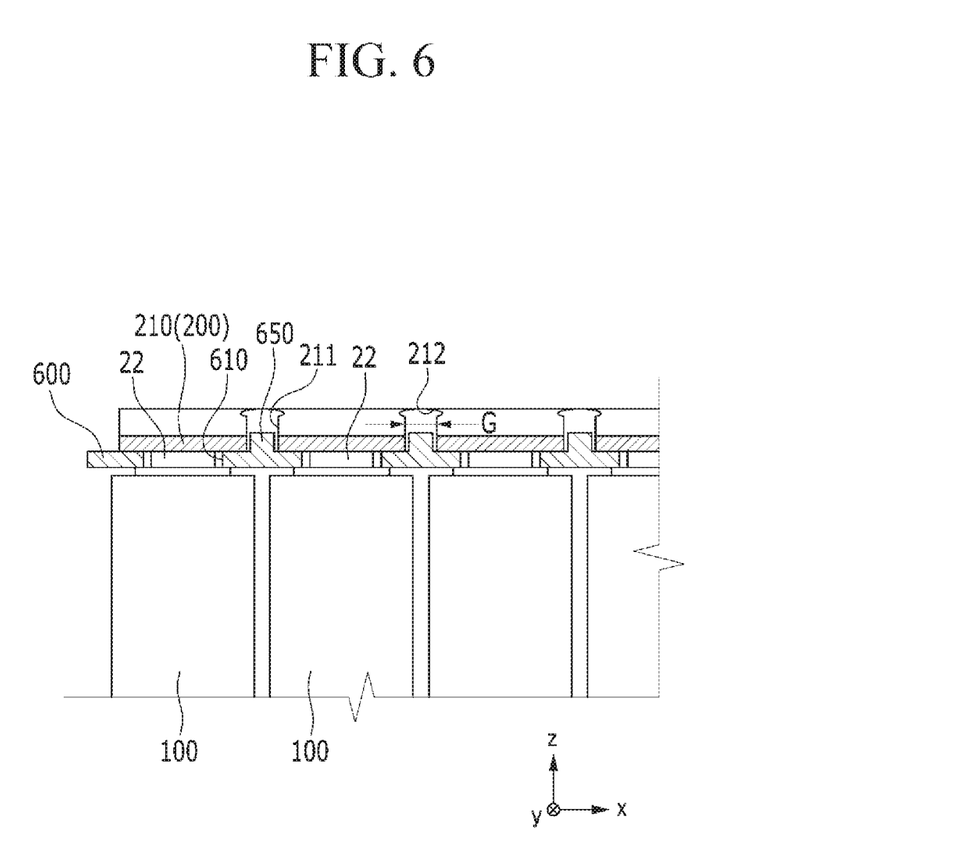
FIG. 6 is a cross-sectional view taken along the line VI-VI of FIG. 2.
Figure 7:
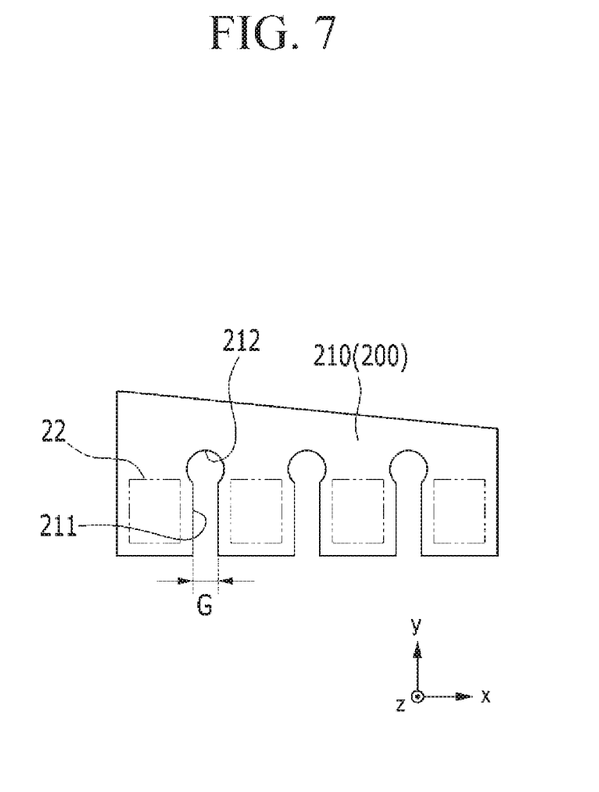
FIG. 7 is a top plan view illustrating further details of the bus bar shown in FIG. 6.

FIG. 6 is a cross-sectional view taken along the line VI-VI of FIG. 2 and FIG. 7 is a top plan view illustrating the bus bar 200 shown in FIG. 6. Referring to FIG. 6 and FIG. 7, the first member 210 of the bus bar 200 includes cutouts 211 between the negative and positive terminals 21 and 22 neighboring in the first direction (x-axis direction).

The cutouts 211 are arranged between the negative and positive terminals 21 and 22 and are formed by being cut along the second direction (y-axis direction) to a position beyond the negative and positive terminals 21 and 22. Even when the unit cells 100 move in the y-axis direction, the cutouts 211 may smoothly absorb a movement of the unit cells 100, while maintaining an electrically connected state of the first member 210 to the negative and positive terminals 21 and 22.

Correspondingly, the bus bar holder 600 includes protrusions 650 arranged to protrude further than the first member 210 in the third direction (e.g., the z-axis direction) between the bus bar holes 610 neighboring in the first direction (e.g., x-axis direction). The protrusions 650 are joined to the cutouts 211 of the first member 210 to absorb and restrict the movement of the unit cells 100 in the first direction (e.g., x-axis direction).

Further, the first member 210 includes expansions 212 arranged at internal ends of the cutouts 211 to have a circular arc shape with a diameter wider than a gap G of the cutouts 211. The expansions 212 serve to disperse a stress acting on the cut 211, when the cutouts 211 absorb the movement of the unit cells 100 in the first, second, and third directions (e.g., the x-, y-, and z-axis directions).

Figure 8:
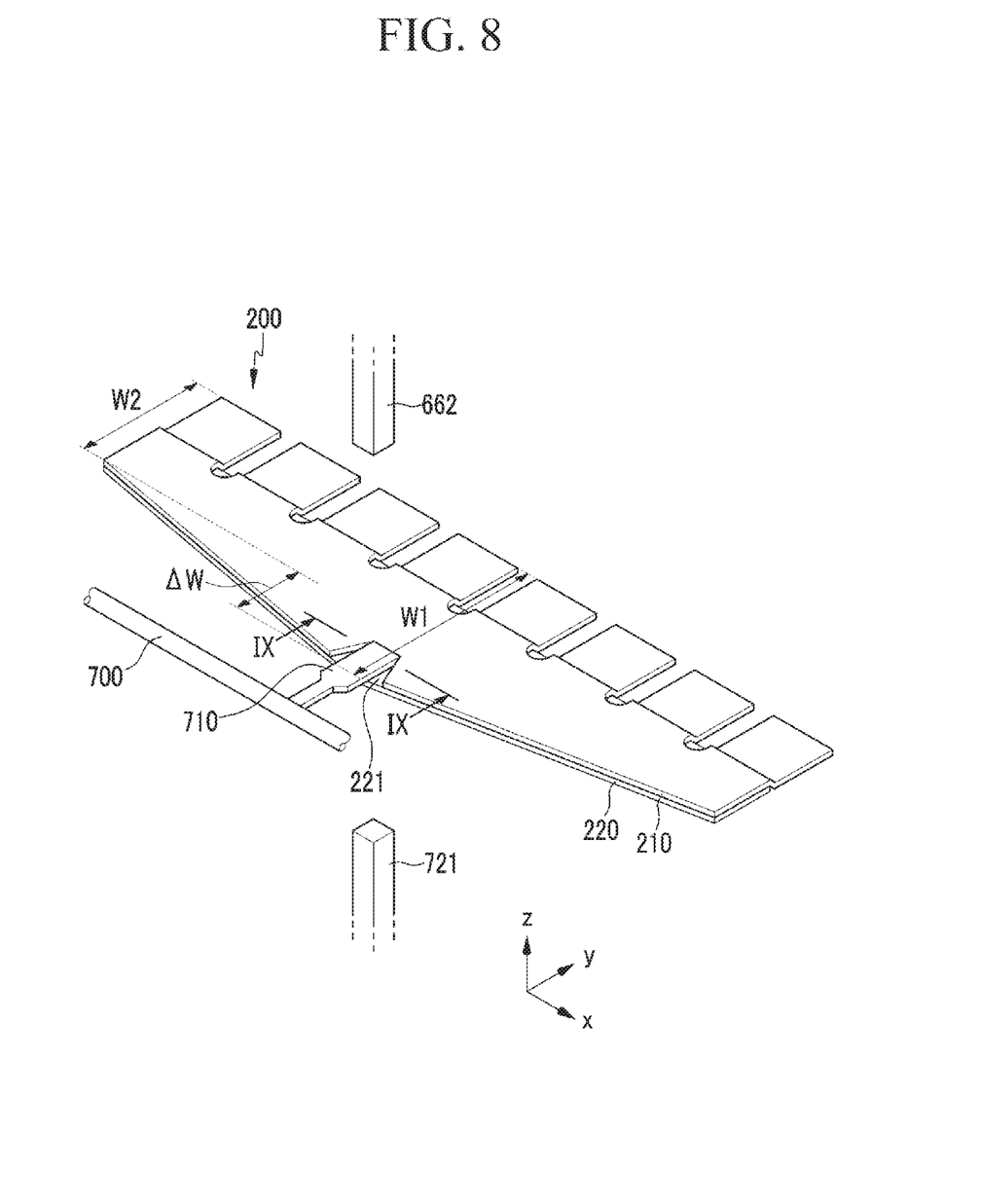
FIG. 8 is a partial perspective view illustrating a connecting state of a power cable and the bus bar shown in FIG. 1 and FIG. 2.
Figure 9:
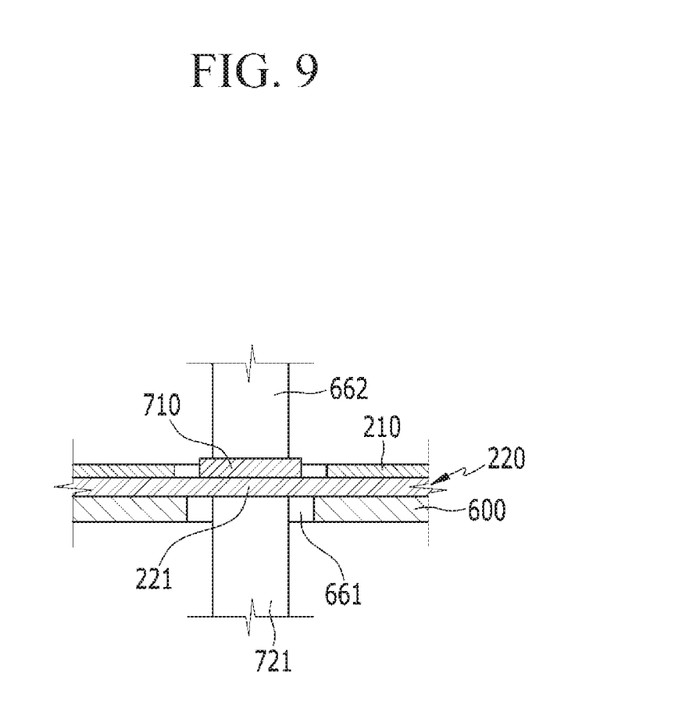
FIG. 9 illustrates a working state of an ultrasonic welding of a terminal of the power cable and the bus bar shown in FIG. 8.

FIG. 8 is a partial perspective view illustrating a connecting state of a power cable and the bus bar shown in FIG. 1 and FIG. 2, and FIG. 9 illustrate a working state of an ultrasonic welding of a terminal of the power cable and the bus bar in FIG. 8.

Referring to FIG. 8 and FIG. 9, the bus bar 200 includes a connection 221 connected to a cable terminal 710 of a power cable 700, and has a maximum width W1 in the third direction (e.g., the y-axis direction) at the connection 221.

The connection 221 formed to have the maximum width W1 in the bus bar 200 has a width difference $\Delta W$ in comparison with a minimum width $W_2$. A portion having the maximum width W1 and a portion having the minimum width W2 are linearly connected. Accordingly, the bus bar 200 may increase the conducting area of the current by an area corresponding to the width difference $\Delta W$ in comparison with an area corresponding to the minimum width $W_2$.

The connection 221 is formed as a partially exposed surface of the second member 220 by partially removing the first member 210 at a portion having an increased conducting area. Accordingly, the cable terminal 710 may be connected to the connection 221 by the ultrasonic welding.

For this purpose, before the ultrasonic welding, the bus bar holder 600 and the bus bars 200 may be joined to each other to form a sub assembly. Herein, the bus bar holder 600 includes welding holes 661 for supporting an anvil 721 supporting the connection 221.

That is, the cable terminal 710 is welded (or connected) to the connection 221 by an ultrasonic vibration that is generated by pressing the connection 221 on which a horn 662 is placed and the cable terminal 710, while the anvil 721 supports the connection 221 through the welding holes 661.

A welding strength may be improved by the ultrasonic welding of the cable terminal 710 of the power cable 700 to the connection 221 of the bus bar 200, after the sub assembly is formed by joining the bus bar 200 to the bus bar holder 600.

The rechargeable battery module may be completed by arranging the bus bar holder 600 forming the sub assembly on the unit cells 100 after the ultrasonic welding, and welding the first members 210 of the bus bars 200 to the unit cells 100.

While the present invention has been described in connection with what is presently considered to be practical example embodiments, it is to be understood the present invention is not limited to the disclosed embodiments, but, on the contrary, is intended to cover various modifications and equivalent arrangements included within the spirit and scope of the appended claims, their equivalents, detailed descriptions, and accompanying drawings.

<Description of Some of the Symbols>

| | |
|---|---|
| 10: electrode assembly | 11: first electrode (negative electrode) |
| 11a, 12a: coating region | 11b, 12b: uncoated region |
| 12: second electrode (positive electrode) | 13: separator |
| 15: case | 20: cap plate |
| 21: first electrode terminal (negative terminal) | |
| 21a, 22a: rivet terminal | |
| 21b, 22b: flange | 21c, 22c: plate terminal |
| 22: second electrode terminal (positive terminal) | |
| 24: vent hole | |
| 25: vent plate | 27: sealing cap |
| 29: electrolyte injection opening | 31: insulating member |
| 36, 37: positive and negative gaskets | 40: external short-circuiter |
| 41: short-circuit tab | 42: short-circuit hole |
| 43: short-circuit member | 46: top plate |
| 51, 52: positive and negative lead tabs | |
| 61, 62: positive and negative insulating members | |
| 100: unit cell | 200: bus bar |
| 210, 220: first and second members | 211: cut |
| 212: expansion | 221: connection |
| 300: end plate | 310: end support |
| 400: side plate | 413: through hole |
| 420: flange | 430: connector |
| 440: joining portion | 500: insulating sheet |
| 600: bus bar holder | 610: bus bar hole |
| 620: bracket | 624: holder vent hole |
| 630: installation groove | 640: joining groove |
| 650: protrusion | 661: welding hole |
| 662: horn | 700: power cable |
| 710: cable terminal | 721: anvil |
| G: gap | H1, H2: terminal holes |
| t1, t2: first and second thicknesses | W1: maximum width |
| W2: minimum width | $\Delta H$: height |
| $\Delta W$: width difference | |

What is claimed is:

1. A rechargeable battery module comprising:
   a plurality of unit cells arranged along a first direction;
   a bus bar holder on the unit cells;
   a bus bar in the bus bar holder electrically connecting the unit cells;
   first and second end plates on opposite ends of the unit cells in the first direction; and
   a side plate on opposite ends of the unit cells in a second direction intersecting the first direction and connected to the end plates,
   wherein the bus bar comprises a first member extending in the first direction and connected to electrode terminals of the unit cells, and a second member connected to the first member,
   wherein the first member is connected to the electrode terminal, and bends to extend in a third direction intersecting the second direction and is connected to an upper surface of the second member.

2. The rechargeable battery module of claim 1, wherein the first member has a first thickness and is connected to the electrode terminal through a bus bar hole of the bus bar holder.

3. The rechargeable battery module of claim 2, wherein the second member has a second thickness thicker than the first thickness and is in the bus bar holder and connected to a surface of the first member.

4. The rechargeable battery module of claim 1, wherein the first member comprises a cutout between the electrode terminals neighboring in the first direction, and extends in the second direction to a position beyond the electrode terminal.

5. The rechargeable battery module of claim 4, wherein the first member comprises an expansion at an internal end of the cutout having a generally circular arc shape with a diameter wider than a gap of the cutout.

6. The rechargeable battery module of claim 4, wherein the bus bar holder further comprises a protrusion extending further than the first member in the third direction between the bus bar holes neighboring in the first direction to be joined to the cutout.

7. The rechargeable battery module of claim 1, wherein the first member comprises aluminum, and the second member comprises copper.

8. The rechargeable battery module of claim 1, wherein the bus bar comprises a connection connected to a cable terminal of a power cable, and has a maximum width in the second direction at the connection.

9. The rechargeable battery module of claim 8, wherein a portion of the first member is removed to expose a surface of the second member to form the connection.

10. The rechargeable battery module of claim 9, wherein the cable terminal and the connection are connected by an ultrasonic welding.

11. The rechargeable battery module of claim 10, wherein the bus bar holder and the bus bar are joined to each other to form a sub assembly.

* * * * *